United States Patent Office 3,527,733
Patented Sept. 8, 1970

3,527,733
COPOLYMERS OF FORMALDEHYDE CONTAINING BIS - [N' - TOLUOSULPHONYL - IMIDAZOLIDINYL-N-SULPHONYL]-ALKANE
Klaus-Peter Peuchert, Cologne-Buchheim, Ernst-Ulrich Kocher and Kuno Wagner, Leverkusen, and Horst Niermann, Cologne-Stammheim, Germany, assignors to Farbenfabriken Bayer Aktiengesellschaft, Leverkusen, Germany, a corporation of Germany
No Drawing. Filed Aug. 5, 1966, Ser. No. 570,438
Claims priority, application Germany, Sept. 3, 1965, F 47,082, F 47,083
Int. Cl. C08g 13/00, 9/24
U.S. Cl. 260—67.5                                    2 Claims

ABSTRACT OF THE DISCLOSURE

Copolymers of trioxane, a cyclic or olefinic comonomer and bis-[N'-toluosulphonyl-imidazolidinyl-N-sulphonyl]-alkane and their utility in thermoplastic molding compositions.

The invention relates to new thermostable copolymers of formaldehyde and to a process for the production of these copolymers, in which formaldehyde or its oligomers, for example, trioxane, are polymerised in the presence of cyclic or olefinic comonomers and bifunctional, nitrogen-containing heterocyclic compounds, for example, 1,4-bis-[N'-toluosulphonyl - imidazolidinyl-N-sulphonyl]-butane.

It is known to transform formaldehyde by numerous methods into linear polymers having different chain lengths. By thermal treatment, the polyoxymethylenes are however easily and quantitatively split into monomeric formaldehyde.

Trioxane, which is the cyclic trimer of formaldehyde, can also be polymerised in the presence of cationically active catalysts, especially Lewis acids, to form linear polyoxymethylenes, but these polymers are thermally unstable. A considerable improvement as regards the thermostability of polyoxymethylenes can be produced by modifying their terminal groups, as has already been proved in about 1930 by H. Staudinger, by the introductiton of terminal acetyl groups or methoxy groups. The introduction of terminal alkyl groups supplies products which, on account of their pure polyacetal structure, have an excellent resistance to alkali in addition to their improved thermostability.

Such modified polyoxymethylenes still show too low a thermostability for technical requirements, since acids and oxygen cause a splitting of the polyoxymethylene chains in their interior, and this in turn results in a total degradation of the molecules concerned. Other methods have already been indicated for counteracting this disadvantage. In one case, the influence of oxygen and acids can be counteracted by the introduction of additional stabilisers which inhibit degradation. In addition, copolymers are produced from trioxane and cyclic ethers, acetals and lactones, which not only contain (—$CH_2$—O—) structural elements, but to a small extent also (—$CH_2$—$CH_2$—O—) structural elements. A degradation of the chain comes to a stop at such an oxyethylene group. In their chemical behaviour, such products are equivalent to those which are obtained by subsequent terminal group alkylation of polyoxymethylenes, i.e. their susceptibility to the action of acids or oxidation influences is unchanged and still high. Consequently, it is also still necessary to use added stabilisers with such copolymers.

Another advance in the improvement of the thermostability of polyoxymethylenes could be produced by using cyclic comonomers which contain sulphur, but in this case the polymerisation velocity of the monomer mixture is reduced, so that there are limits to the quantity of these comonomers in practice.

Furthermore, trioxane has already been polymerised by using cyclic organo-nitrogen compounds of the type of the 1,3-bis-alkyl (or aryl)-sulphonyl-imidazolidines as comonomers. The polyoxymethylenes which are obtained in this way show a further improvement in their thermostability.

The polyoxymethylenes produced by all these methods are very suitable for processing by the injection moulding process.

On account of the insufficient viscosity of the thinly liquid polyoxymethylene melts, however, there are limitations to the processing thereof on extruders. For example, it is not possible to produce tubes on extruders of normal design.

A process for the production of trioxane copolymers has now been found in which trioxane is polymerised together with cyclic or olefinic comonomers and with bifunctional heterocyclic nitrogen compounds of the general formula:

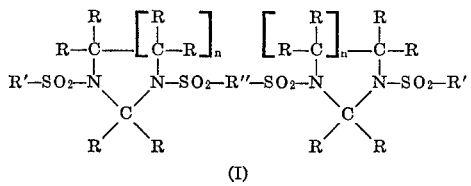

(I)

in the presence of cationically active catalysts at temperatures between —50 and +120° C.

The melt indices of the trioxane copolymers which are obtained are in the range of from about 2.5 to 5, measured according to ASTM D1238–62T, the melt showing a particularly high tenacity. In the general Formula I, R represents hydrogen, a lower alkyl radical or a lower haloalkyl radical (lower alkyl comprising alkyl with 1 to 6 carbon atoms), R' represents an alkyl radical, a haloalkyl radical, an aryl radical, an aralkyl radical or an alkaryl radical the possible number of carbon atoms in these radicals being up to 20, R" represents a methylene chain with up to 20 carbon atoms or a bifunctional aromatic radical and $n$ is an integer of from 1 to 3 inclusive.

The two ring systems of the compounds thus contain only carbon and nitrogen atoms, only C—N bonds being present as well as at least one C—C bond and the nitrogen atoms being connected by way of a sulphonyl-sulphur atom to the radical R' or R". The cyclic parts are accordingly to be interpreted as 1,3-diazacycloalkanes and the compounds as tetrasulphonamides.

Bifunctional heterocyclic nitrogen compounds which are particularly suitable for the process are, for example:

1,4-bis-[N'-toluo-sulphonyl-imidazolidinyl-N-sulphonyl]-butane
1,3-bis-[N'-toluo-sulphonyl-imidazolidinyl-N-sulphonyl]-propane
1,12-bis-[N'-toluo-sulphonyl-imidazolidinyl-N-sulphonyl]-dodecane
4,4'-bis-[N'-toluo-sulphonyl-imidazolidinyl-N-sulphonyl]-diphenylether
1,4-bis-[N'-benzene-sulphonyl-imidazolidinyl-N-sulphonyl]-butane
1,4-bis-[N'-methane-sulphonyl-imidazolidinyl-N-sulphonyl]-butane
1,4-bis-[N'-chloromethane-sulphonyl-imidazolidinyl-N-sulphonyl]-butane
1,4-bis-[N'-toluo-sulphonyl-hexahydropyrimidinyl-N-sulphonyl]-butane
1,4-bis[N'-toluo-sulphonyl-perhydro-(1,3)-diazepinyl-N-sulphonyl]-butane Cyclic or olefinic comonomers in accordance with this invention are, for example:

(1) Cyclic ethers of the general formula:

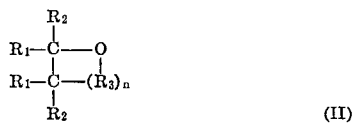

(II)

in which $R_1$ and $R_2$ represent hydrogen, lower alkyl radicals and lower haloalkyl radicals, and $R_3$ represents methylene, oxymethylene, alkyl-substituted and haloalkyl-substituted methylene and lower alkyl-substituted and haloalkyl-substituted oxymethylene radicals, and $n$ is a number between 1 and 3 inclusive such as those described in U.S. patent specification No. 3,027,352.

(2) Cyclic thioethers of the general formula:

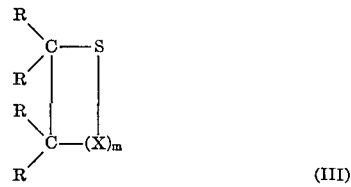

(III)

wherein R represents a hydrogen atom, a lower alkyl radical or a lower haloalkyl radical, X represents a methylene, methylene-ether or methylene-thioether radical, and $m$ is an integer from 0 to 3, the ring system containing only —C—S— or —C—O— bonds as well as —C—C— bonds, such as those described in German Auslegeschrift No. 1,176,862.

(3) Heterocyclic nitrogen compounds of the general formula:

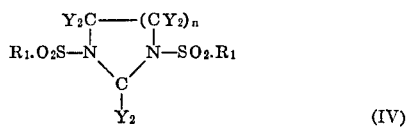

(IV)

wherein Y represents a lower alkyl radical or a lower haloalkyl radical, $R_1$ represents an alkyl radical, an aryl radical, an aralkyl radical or an alkaryl radical, the possible number of carbon atoms being up to 20, and $n$ is an integer of from 1 to 3, inclusive, such as those which are described in U.S. Pat. No. 3,378,529.

(4) Silicon-containing comonomers, which are described in U.S. Pat. No. 3,369,039.

(5) Nitrogen-containing cyclic comonomers of the general formula:

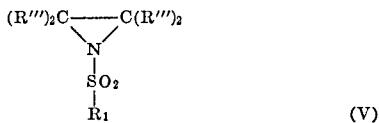

(V)

wherein $R'''$ represents hydrogen or a lower alkyl radical, $R_1$ represents an alkyl radical, an aryl radical, an aralkyl radical or an alkaryl radical, the possible number of carbon atoms being up to 20, such as those which are described in U. S. Pat. No. 3,390,130.

Nitrogen containing cyclic comonomers of the general formula:

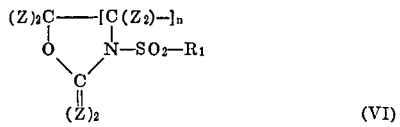

(VI)

wherein Z represents hydrogen, a lower alkyl radical or a lower haloalkyl radical, $R_1$ represents an alkyl radical, an aryl radical, an aralkyl radical or an alkaryl radical, the possible number of carbon atoms being up to 20, and $n$ is an integer of from 1 to 3, inclusive.

(6) Comonomers with vinyl groups, e.g. styrene, vinylacetate, vinylethylether and derivatives of acrylic acid, such as acrylamide and methacrylamide.

The preferred compounds are the cyclic organic nitrogen compounds of the formula:

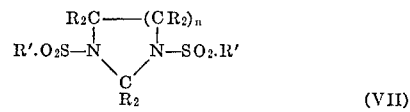

(VII)

wherein R represents a lower alkyl radical or a lower haloalkyl radical, R' represents an alkyl radical, an aryl radical, an aralkyl radical or an alkaryl radical, the possible number of carbon atoms being up to 20, and $n$ is an integer of from 1 to 3, inclusive, especially 1,3-bis-alkyl(or aryl)-sulphonyl-imidazolidines, the alkyl radicals preferably having 1 to 6 carbon atoms and the aryl radical being advantageously phenyl.

The bifunctional heterocyclic nitrogen compounds of Formula I can, for example, be obtained according to an earlier proposal of the applicants by reacting 2 mols of the N-monoaryl(or alkyl)-sulphonyl-alkylene diamines of Formula VIII with 1 mol of the corresponding disulphonic acid chlorides of Formula IX to form the new intermediate compound X and by subsequent two-fold ring closure with aldehydes or ketones in the presence of an acid as catalyst at temperatures between 0° C. and 130° C., optionally in a neutral solvent. In this case, R R', and R'' have the meaning already indicated.

$$2R'-SO_2-NH-CR_2-[CR_2]_n-NH_2 + ClSO_2-R''-SO_2Cl$$

$$\downarrow$$

$$R'-SO_2-NH-CR_2-/CR_2/_n-NH-SO_2-R''-SO_2-NH-/CR_2/_n-CR_2-NH-SO_2-R'$$

$$\downarrow$$

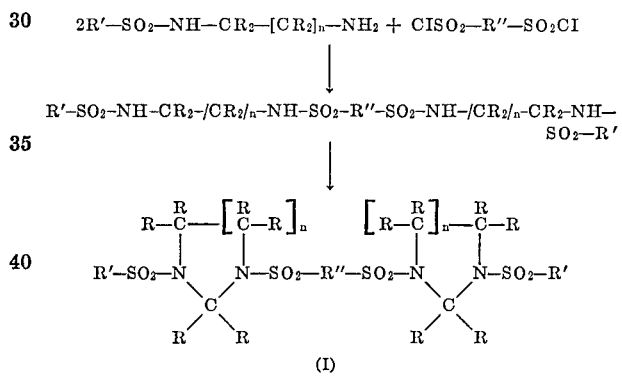

(I)

The quantity of the comonomers, advantageously in respect of the cyclic or olefinic monomers, especially the cyclic organo-nitrogen compounds, is in the range of about 0.5 to 20 mol percent, and advantageously between 0.5 and 5 mol percent, based on trioxane which is being used, and as regards the bifunctional compounds, it is in the range of from 0.01 to 1 mol percent, if the polymer is to have the properties of polyoxymethylene.

The bifunctional organo-nitrogen monomers which are to be copolymerised according to the invention surprisingly do not polymerise by themselves under the conditions of the copolymerisation.

The following are, for example, to be considered as cationically active catalysts for the process according to the invention:

Strong mineral acids, such as sulphuric acid, perchloric acid, aliphatic and aromatic sulphonic acids, such as methane-sulphonic acid, butane-sulphonic acid, benzenesulphonic acid, p-toluosulphonic acid, Lewis acids such as boron trifluoride, boron trichloride, aluminium trichloride, ferric chloride, antimony pentachloride, titanium tetrachloride and tin tetrachloride or the corresponding fluorides, addition compounds of boron halides with ethers, carbonesters, carboxylic anhydrides, amines, nitriles and monocarboxylic or dicarboxylic acid amides, e.g. the adducts of boron trifluoride with diethyl ether, di-n-butyl ether, anisole, ethyl acetate, acetanhydride, diphenylamine, acetonitrile, dimethyl formamide, glacial acetic acid or water. Halogen-containing organometallic compounds of aluminium, such as monoalkyl aluminium dichloride, can also be used as cationically active compounds. Oxonium salts and carboxonium salts, such as triethyl oxonium fluoborate and 2-methyldioxolenium fluoborate and fluoborates of aryl-diazonium compounds, which change at high temperature and with nitrogen being split off into aryl cations, such as p-nitrophenyl diazonium fluoborate, likewise belong to the class of the cationically active catalysts which are suitable for the process.

The catalysts are added to the polymerisation medium in quantities of 0.001% to 1% by weight, based on the weight of the formaldehyde introduced.

The polymerisation can with advantage be carried out in a closed apparatus which permits working at a high pressure of up to about 5 atm. When the polymerisation is carried out under high pressure, it is also possible to work at a relatively high temperature up to about 150° C.

The copolymerisation can be carried out as block polymerisation, which takes place within a short time and in a practically quantitative yield. In this case, the catalyst is melted together with the trioxane, and the comonomer and the bifunctional components are simultaneously added, or first of all the trioxane is melted with the comonomer and the bifunctional component and the catalyst is then added, possibly in an inert solvent. The polymerisation can, however, also be carried out in suspension in an organic liquid, in which trioxane has only a limited solubility. Compounds suitable for this form of the process are, for example, straight-chain aliphatic hydrocarbons with more than 8 carbon atoms or their mixtures, for example a $C_{12}$–$C_{18}$ fraction having the boiling range of 230° C. to 320° C.

If the polymerisation is carried out as a solution polymerisation, it is for example possible to use the following organic solvents: benzene, toluene, hexane, heptane, cyclohexane, iso-octane, white spirit and chlorinated hydrocarbons, as well as hydrogenated oligomers ($n=2$ to $5$) of isobutylene and their mixtures.

On being heated, some of the copolymers experience a certain degradation before they reach their maximum stability. This degradation reaction can be accelerated by heating the crude polymer in inert solvents, but also in alcohols which form semi-acetals with the degraded formaldehyde. For promoting this reaction, it is expedient to introduce organic or inorganic bases which simultaneously destroy the polymerisation catalyst. Light stabilisers, dyestuffs, pigments and possibly heat and oxidation stabilisers, fillers or processing auxiliaries such as lubricants and plasticisers can be added to the polymers.

The properties of the copolymers can also be further modified by additional use of other comonomers, for example, cationically polymerisable olefines or cyclic organic oxygen and/or sulphur compounds. Compounds mentioned as examples for this purpose are styrene, acrylonitrile, ethyl vinyl ether, methyl vinyl sulphone or epoxy compounds such as ethylene oxide or propylene oxide, cyclic acetals such as 1,3-dioxolane or diethylene glycol formal, as well as their analogous thio compounds such as ethylene sulphide, propylene sulphide, 1,3-oxthiolane or thiodiglycol formal.

The copolymers produced according to the process only obtain their excellent thermostability after a brief thermal or chemical treatment, during the course of which unstable fractions are degraded. This can be effected by heating the substances alone or in suspension, e.g. in high-boiling hydrocarbons or also in solution, for example, in dimethyl formamide, butyrolactone or dimethyl sulphoxide, to temperatures between 120° C. and 250° C., advantageously 170° C. to 230° C.

The degradation of unstable fractions can however also be effected by the action of an aqueous sodium hydroxide solution or the action of alcohols with up to 10 carbon atoms, e.g. cyclohexanol, in the presence of basic compounds. Alkali hydroxides and organic bases such as pyridine, tri-n-butylamine, alkanolamines etc., are suitable as basic compounds. The degradation up to the terminal comonomer units can also be effected by a granulation process in an extruder, optionally with the addition of organic bases.

Light stabilisers, dyestuffs, pigments and optionally heat and oxidation stabilisers, processing auxiliaries, fillers or plasticisers can also be added. It is possible to work under reduced pressure or in an inert gas atmosphere.

By far the most important field of application for polyoxymethylenes (both of the homopolymers and of the copolymers) has hitherto remained restricted to the manufacture of relatively small, injection-moulded articles. The excellent flowability and thin liquid nature of the melt, which is of great advantage in the injection moulding process, since this readily guarantees a satisfactory filling of even complicated mould tools, is found to be a disadvantage with both types of material when extruded.

The known good properties of the polyoxymethylene types (e.g. excellent dimensional stability, even at high temperatures and good electrical properties combined with remarkable mechanical properties and low water absorption) could consequently still not be fully utilised in various interesting fields, for example, in vehicle construction or in the electrical industry. The types of material formerly available, even those of relatively high molecular weight, are unsuitable for the manufacture of components having a large area, especially by the extrusion or hot-shaping methods, because of their crystalline structure (crystallinity from about 70% to 75%) and the consequential narrow softening range and thin liquid nature of the melt.

The types of material formerly recommended for extrusion purposes have a melt index of 2.5 to 3.0 [g./10 min.]; they do not however, adhere to the mould during the extrusion but "flow away" and shrink to a high degree. Only by using special techniques and precautionary measures was it formerly possible to manufacture profile elements, tubes, plates and wire insulations with the conventional extrusion plants. The production of foils by the blowing method was hitherto completely impossible, as was also the deepdrawing of sheet material. In order to be able, for example, to manufacture hollow bodies with a smooth surface, the temperatures of the tools had to be about 125° C. This made necessary a heating with thermostats instead of the former cooling with water. An economic production thus became impossible. Frequently it was not possible, even under these conditions, to produce smooth surfaces, even when a relatively high blowing pressure was used.

Above all, in the manufacture of tubes, uniform wall thicknesses could only be produced with great difficulty and with a heavy expense for equipment, such as long cooling paths and pressure calibration, on account of the relatively low tenacity of the plasticised material, since already slight differences in temperature resulted in an irregular swelling in the tube wall thickness.

Thus, a good flow behaviour of the melt, in combination with a sufficient tenacity of the plasticised material, is absolutely necessary for economic processing on the conventional machines used for themoplasts.

With a melt index between 2.5 and 5.0 g./10 min. i.e. a good flowability, the trioxane copolymers according to the invention have such a tenacity in the melt form that it is possible for the first time easily to produce foils and sheets from this material on processing machines used for thermoplasts without the difficulties previously referred to. Excessively high heating of the moulds is no longer necessary.

The melt indices of the polyoxymethylenes according to the invention are thus equal to, or even higher than, those of the polyoxymethylenes formerly proposed for extrusion and hot-shaping processes. It is surprising that the tenacity of the melt of the new polyoxymethylenes at an equal or even higher melt index, is sufficient in order to manufacture satisfactory moulded components by extrusion or hot-shaping processes.

The moulded components no longer shrink to such a high degree and there are also no deleterious effects on the surface quality.

It was also never possible hitherto successfully to obtain satisfactory sheets on the roller from formaldehyde polymers; the material became smeared and stuck and could only be drawn off the roller again by using very great care. A satisfactory rolled sheet can be produced with the materials according to the invention. As a result, the incorporation of heat stabilisers (e.g. polyamides) and the mixing with components having an elasticising action are improved.

As a result of the tenacity of the melt of the products according to the invention, it is now possible to produce smaller wall thicknesses during the manufacture of hollow bodies (e.g. bottles). Sheet-like material can be satisfactorily processed by all shaping methods used in the hot-shaping art.

In the following examples, the intrinsic viscosities $\eta_i$ in p-chlorophenol are measured at 60° C. in a 0.5% solution, and the melt indices are determined by the method of ASTM D1238–62T.

EXAMPLE 1

360 g. of trioxane 18 g. of 1,3-bis-methanesulphonyl-imidazolidine, 0.72 g. (0.2% by weight) of 1,4-bis-[N'-toluosulphonyl-imidazolidinyl-N-sulphonyl]-butane (produced by reacting 2 mols of N-monotoluosulphonyl-ethylene diamine with 1 mol of 1,4-butane disulphonic acid chloride and subsequent ring closure with 40% formaldehyde in formic acid) and 450 ml. of cyclohexane are initially provided, and 6 ml. of a 2% solution of boron trifluoride-dibutyl etherate in cyclohexane is added at 70° C. while stirring. With a raising of the temperature, the polymer is precipitated after a short time from the solution in powder form. After 25 minutes, the reaction has ceased and the copolymer is filtered off with suction and washed with methanol. The yield was 315 g. in air-dry form. The heat stability was measured after treatment for 10 hours with a 5% sodium hydroxide solution at 95° C. The decrease in weight was 1.8% per hour at 222° C. The intrinsic viscosity was $\eta_i = 1.746$. For determining the melt index, the crude polymer, after the addition of alkali, stabilisers and lubricants, was directly degraded with an extruder into a stable material. The melt index was 3.6 [g./10 min.].

EXAMPLE 2

The procedure of Example 1 was followed, but now using 1% by weight (3.6 g.) of 1,4-bis-[N'-toluosulphonyl imidazolidinyl-N-sulphonyl]-butane instead of 0.2% by weight thereof. The crude yield (air-dry) was 300 g. The decrease in weight when measuring the thermostability was found to be 1.2% per hour at 222° C. It was no longer possible to determine the intrinsic viscosity. The melt index was 2.5 [g./10 min.].

EXAMPLE 3

The procedure of Example 1 was followed, but using in this case, as bifunctional component, 0.36 g. (0.1% by weight) of 1,3-bis-[N'-toluosulphonyl-imidazolidinyl-N-sulphonyl]-propane, prepared in a similar manner. 290 g. of crude material were obtained. The measurement of the thermostability after alkali treatment showed a decrease in weight of 1.8% per hour at 222° C.; $\eta_i$ was 1.709 and the melt index was 3.4 [g./10 min.].

EXAMPLE 4

The procedure of Example 1 was followed, only using 1.8 g. (0.5% by weight) of 1,4-bis-[N'-benzene-sulphonyl-imidazolidinyl-N-sulphonyl]-butane, prepared in a similar manner, as bifunctional comonomer. The air-dry crude polymer weighed 300 g. The decrease in weight in the thermostability test was 1.1% per hour at 222° C., $\eta_i$ was 2.021 and the melt index was 2.9 [g./10 min.].

EXAMPLE 5

The procedure of Example 1 was followed. 0.72 g. (0.2% by weight) of 1,4-bis-[N'-toluosulphonyl hexahydropyrimidinyl - N - sulphonyl] - butane (prepared in similar manner) was used as the bifunctional comonomer in this example. The air-dry polymer weighed 300 g. The thermostability measurement showed decrease in weight of 2.1% per hour, and a value of 1.570 was found for $\eta_i$. The melt index was 4.2 [g./10 min.].

EXAMPLE 6

Blowing foils

Machine:
  Reifenhauser extruder—1:2.4
  Worm—15D, 45 mm$\phi$
  Speed—20 r.p.m.
  Without filter assembly
Temperatures (from filling hopper): 160/170/180/180/180/180/175° C.

The material discharged free from bubbles and could be blown without any difficulties to form a flexible tube width or diameter 30 cm., which could be continuously coiled over the withdrawal device.

Mechanical test of the foil materials:

|  | Longitudinally | Transversely |
|---|---|---|
| Breaking strength (kp./cm.²) | 477 | 515 |
| Elongation at break (percent) | 65 | 29 |
| Tensile strength (kp./cm.²) | 567 | 572 |
| Resistance to further tearing according to DIN 535 15 | 32 | 29 |

EXAMPLE 7

Hot-shaping

Material rolled for 10 minutes at 200° C., good sheet formation.
Pressed plates with the dimensions 200 x 200 x 0.7 mm. produced.
Plates shaped on an Illig deep-drawing machine type U–60.
Temperature at the plate surface, about 180° C.
Heating time: variable, about 400 to 500 seconds at 70% heating capacity.
Shape: stepped pyramids.

The moulded component was removed from the mould in a completely satisfactory manner. This is surprising, in view of the complicated design of the mould.

We claim:

1. A composition of matter comprising a copolymer of (a) trioxane, (b) 0.5–20 mol percent, based on trioxane, of a cyclic ether of the general formula:

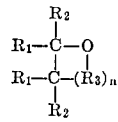

in which $R_1$ and $R_2$ represent hydrogen, lower alkyl radicals, and lower haloalkyl radicals and $R_3$ represents methylene, oxymethylene, alkyl-substituted and haloalkyl-substituted methylene and lower alkyl-substituted and haloalkyl-substituted oxymethylene radicals, and $n$ is a number between 1 and 3; a cyclic thioether; a silicon containing comonomer; a vinyl group containing comonomer; a comonomer of the formula

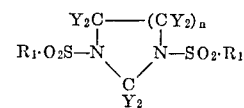

containing a total of up to 20 carbon atoms wherein Y is lower alkyl or lower haloalkyl, $R_1$ is alkyl, aryl, aralkyl or alkaryl and $n$ is 1 to 3; a comonomer of the formula

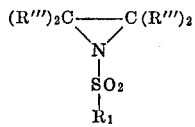

containing a total of up to 20 carbon atoms wherein $R'''$ is hydrogen or lower alkyl, $R_1$ is alkyl, aryl, aralkyl or alkaryl or a monomer of the formula

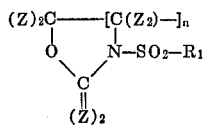

containing a total of up to 20 carbon atoms wherein Z is hydrogen, lower alkyl or lower haloalkyl, $R_1$ is alkyl, aryl, aralkyl or alkaryl and $n$ is 1 to 3 and (c) 0.01 to 1 mol percent based on trioxane of a compound of the formula:

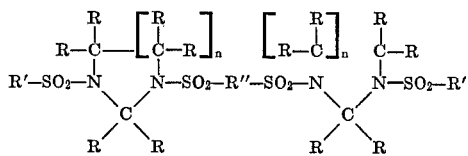

wherein R is hydrogen, alkyl having 1 to 6 carbon atoms or haloalkyl having 1 to 6 carbon atoms; R' is alkyl, haloalkyl, aryl, aralkyl or alkaryl having up to 20 carbon atoms; R" is a methylene chain having up to 20 carbon atoms or a bifunctional aryl radical and $n$ is an integer from 1 to 3 inclusive, said (a), (b) and (c) having been copolymerized in the presence of a cationically active catalyst at temperatures between −50 and 120° C.

2. The composition of matter of claim 1 wherein (c) is selected from the group consisting of 1,4-bis-[N'-toluosulphonyl-imidazolidinyl-N-sulphonyl]-butane,
1,3-bis-[N'-toluosulphonyl-imidazolidinyl-N-sulphonyl]-propane,
1,12-bis-[N'-toluosulphonyl-imidazolidinyl-N-sulphonyl]-dodecane,
4,4'-bis-[N'-toluosulphonyl-imidazolidinyl-N-sulphonyl]-diphenylether,
1,4-bis-[N'-benzenesulphonyl-imidazolidinyl-N-sulphonyl]-butane,
1,4-bis-[N'-methanesulphonyl-imidazolidinyl-N-sulphonyl]-butane,
1,4-bis-[N'-chloromethanesulphonyl-imidazolidinyl-N-sulphonyl]-butane,
1,4-bis-[N'-toluosulphonyl-hexahydropyrimidinyl-N-sulphonyl]-butane and
1,4-bis-[N'-toluosulphonyl-perhydro-(1,3)-diazepinyl-N-sulphonyl]-butane.

References Cited
UNITED STATES PATENTS
3,378,529  4/1968  Kocher et al. _____ 260—67.5

WILLIAM H. SHORT, Primary Examiner

T. E. PERTILLA, Assistant Examiner

U.S. Cl. X.R.

260—37